United States Patent [19]

Smith

[11] Patent Number: 4,981,204
[45] Date of Patent: Jan. 1, 1991

[54] MOBILE MATERIAL-HANDLING APPARATUS

[76] Inventor: Roger G. Smith, 17693 SW. Blue Heron Rd., Lake Oswego, Oreg. 97034

[21] Appl. No.: 430,274

[22] Filed: Nov. 2, 1989

[51] Int. Cl.⁵ ............................................. B65G 15/26
[52] U.S. Cl. ................... 198/313; 198/311; 198/632
[58] Field of Search .............. 198/311, 312, 313, 314, 198/861.1, 861.2, 632; 414/501, 502, 503, 505, 523, 528, 919

[56] References Cited

U.S. PATENT DOCUMENTS

| 2,745,540 | 5/1956 | Smoker | 198/313 |
| 4,058,198 | 11/1977 | O'Neill et al. | 198/313 |
| 4,303,506 | 12/1981 | Finlay | 198/313 X |
| 4,591,432 | 5/1986 | Hartl | 198/313 X |
| 4,813,526 | 3/1989 | Belanger | 198/313 |

Primary Examiner—H. Grant Skaggs
Assistant Examiner—Keith L. Dixon
Attorney, Agent, or Firm—Kolisch, Hartwell & Dickinson

[57] ABSTRACT

A mobile material handling apparatus which includes a collapsible conveyor system supported on a wheel-supported vehicle frame. The conveyor system may be shifted from a collapsed state to an extended state through operation of fluid-powered rams. Hinges and pivoted links guide frame sections in the conveyor system for movement in defined paths.

10 Claims, 4 Drawing Sheets

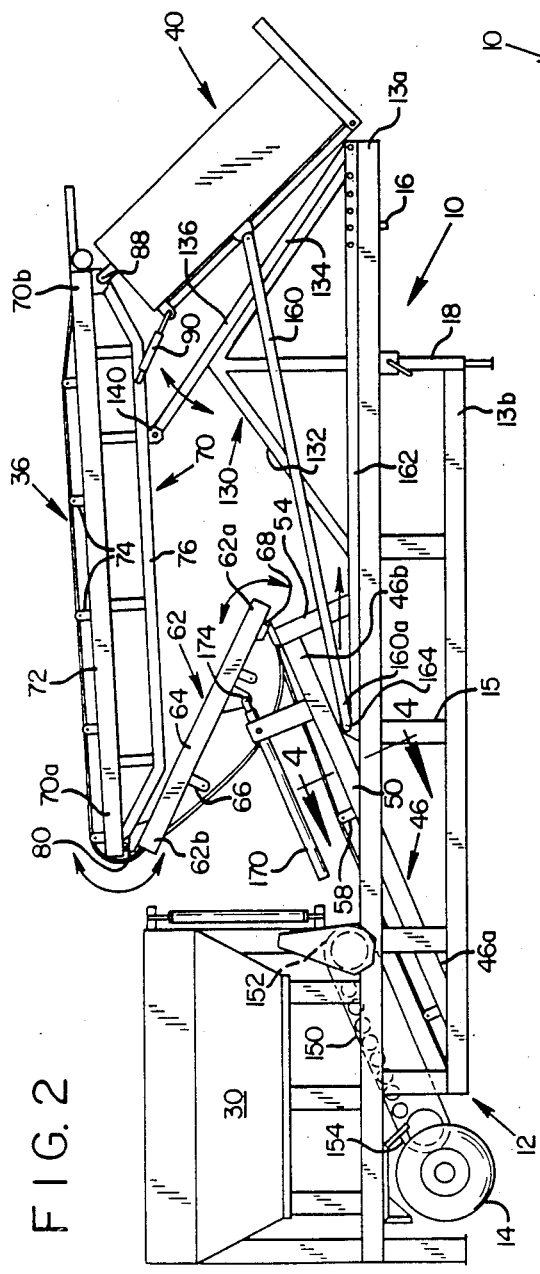

MOBILE MATERIAL-HANDLING APPARATUS

BACKGROUND AND SUMMARY OF THE INVENTION

This invention relates to material-handling apparatus, and more particularly to material-handling apparatus which includes an elongate, articulated conveyor system supported on a mobile vehicle frame, with the conveyor system being collapsible to accommodate road transport of the apparatus.

The particular apparatus described herein takes the form of a mobile screener usable, for instance, in the screening of the crushed output of a rock crusher to separate the output into piles of differently sized material. While the apparatus described herein is a mobile screener, it is appreciated that, with respect to certain features of the invention, such may have applicability in other uses, such as in the movement of dirt or other bulk material where a conveyor is employed for the movement.

The portable screener disclosed herein typically may take the form of a relatively rugged piece of equipment, which is designed to be moved over the road from one place to another to provide screening capability at the particular location of the crusher and the rock which is to be crushed. A feature of the screener is that such includes an elongate conveyor system suitably supported on an elongate wheel-supported vehicle frame, with this conveyor system relatively easily adjusted between a collapsed, folded-up state, which adapts the equipment for road transport, and an extended state, which adapts the conveyor system for the conveying of material along an elongate conveyor path. In making this adjustment, there is no need, as typifies some prior art constructions, for having hoists or auxiliary equipment at the site where the screener is to be set up for operation. Adjustments are made through operation of power-operated devices, such as fluid-operated rams or motors, which swing sections in the conveyor system to appropriate positions, with such sections interconnected and moving in defined paths.

A general object of this invention, therefore, is to provide a new and improved material-handling apparatus which is adapted for transport over the road, and which includes an elongate conveyor system suitably supported on an elongate vehicle frame, the conveyor system being shiftable from a collapsed state on the vehicle frame, which adapts the apparatus for road transport, and an extended state, which adapts the apparatus to perform the work operation desired.

A more specific object is to provide such apparatus which includes a linkage structure supporting the conveyor system on the vehicle frame, which guides portions of this conveyor system in defined paths, with the conveyor system shifting from a collapsed to an extended state.

Another object is to provide such a material-handling apparatus which includes multiple conveyor frame sections supporting a conveyor belt in the conveyor system, these frame sections being hingedly interconnected, and remaining interconnected, whether the conveyor system be in its collapsed or extended state. The conveyor frame sections are supported through links on the vehicle frame, so that the frame sections move in defined paths with respect to each other with shifting of the conveyor system from a folded, collapsed state to an extended state.

In a preferred embodiment of the invention, the material-handling apparatus comprises a screener, and the conveyor system, when extended, extends in an elongate, inclined path from a location adjacent the rear of the vehicle frame to a location disposed in advance of the opposite end of the vehicle frame. A hopper, for collecting and distributing material on this conveyor system, occupies the position directly adjacent the rear of the vehicle frame. A screen assembly, hingedly connected to the upper end of the conveyor system when extended, inclines downwardly from its hinged connection to provide for gravity screening of material flowing thereover. The incline of this screen assembly is adjustable through operation of a power-operated means, such as a fluid-operated ram, and the screen assembly, in any given adjusted position, is supported through struts extending from the frame of the screen assembly back to the vehicle frame.

BRIEF DESCRIPTION OF THE DRAWINGS

These and other objects and advantages of the invention will be more fully apparent from a reading of the following description, to be taken in conjunction with the accompanying drawings, wherein:

FIG. 2 is a side elevation of the screener illustrated in FIG. 1, showing a conveyor system therein in a collapsed and folded-up state, and in the state which would ready the vehicle for road transport;

FIG. 3 is a side elevation, similar to FIG. 2, but showing the conveyor system in the screener extended, whereby such defines an elongate conveyor path projecting from underneath a hopper in the vehicle to an inclined screen assembly carried at the distal end of the conveyor system.

DETAILED DESCRIPTION OF A PREFERRED EMBODIMENT

Figure 1:
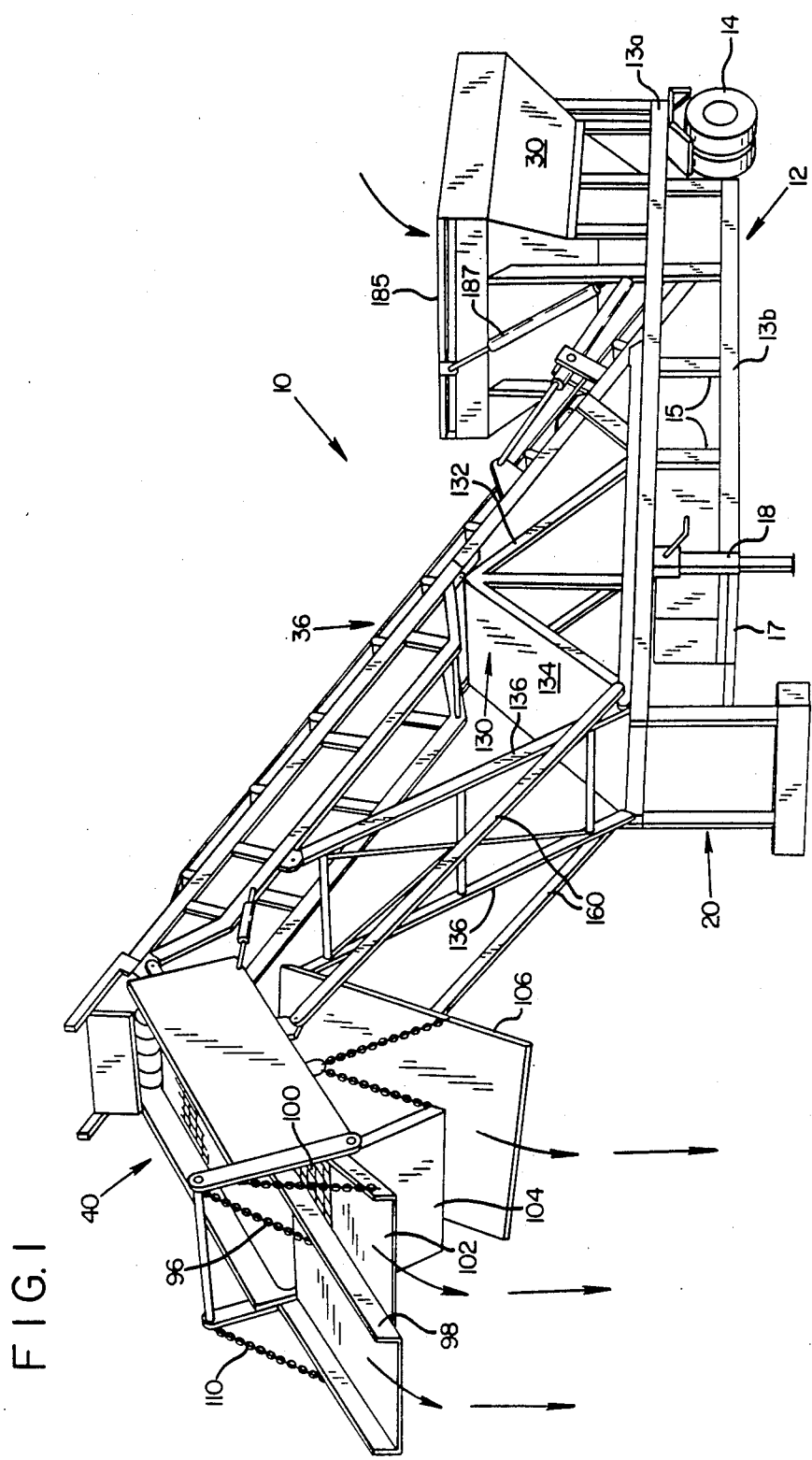
FIG. 1 is a perspective view, illustrating a screener constructed as contemplated herein.

Referring now to the drawings, the mobile material-handling apparatus pictured takes the form of what is referred to herein as a mobile screener, and has been given the general reference numeral 10 in the drawings. The screener illustrated includes a wheel-supported vehicle frame shown at 12, with wheels 14 suitably mounted under the rear end of this frame providing the support necessary for moving the frame over the highway.

Vehicle frame 12 may take various forms of construction. As illustrated, the vehicle frame includes longitudinals 13a, 13b extending along each side of the frame. On each side, the longitudinals are interconnected as by uprights 15. Interconnecting the longitudinals on opposite sides of the frame are suitable transverse members as exemplified by the member 17 shown in FIG. 1.

A fifth wheel, partially obscured but including a pin 16, is provided adjacent the forward end of the vehicle frame. This is utilized in connecting the apparatus to a conventional truck tractor unit which is employed in pulling the apparatus over the highway.

With the vehicle frame dismounted from a truck tractor unit, landing gear crank-down jacks 18 are actuated to support the frame at its forward end above the ground. In addition, and to provide additional support, detachable leg structure, shown at 20 and in FIG. 1, may be provided extending from the forward end of the frame to the ground.

In the mobile screener herein described, crushed rock, gravel or other material which is to be screened and thus separated into different size ranges is held in a loading hopper, illustrated at 30. Material travels through control gates (not shown) provided at the base of this hopper to lodge on the lower end of an elongate articulated belt conveyor system indicated generally at 36. This belt conveyor system has a collapsed, folded state illustrated in FIG. 2, which is the state of the conveyor system with the apparatus ready for road transport. The conveyor system can be shifted from this collapsed, folded state, to an extended state, which is the condition of the conveyor system illustrated in FIG. 3. In this condition, the conveyor system defines an elongate inclined conveyor path for conveying material upwardly to a discharge end of the conveyor system. Material then cascades from the discharge end of the conveyor system onto a screen assembly, indicated generally at 40.

Considering now in more detail the construction of conveyor system 36, the system includes a first conveyor frame section 46, having an end indicated at 46, located under the loading hopper. This conveyor frame section inclines upwardly from end 46a to an opposite end 46b located above longitudinal 13a, and approximately midway between the ends of the vehicle frame.

Figure 4:
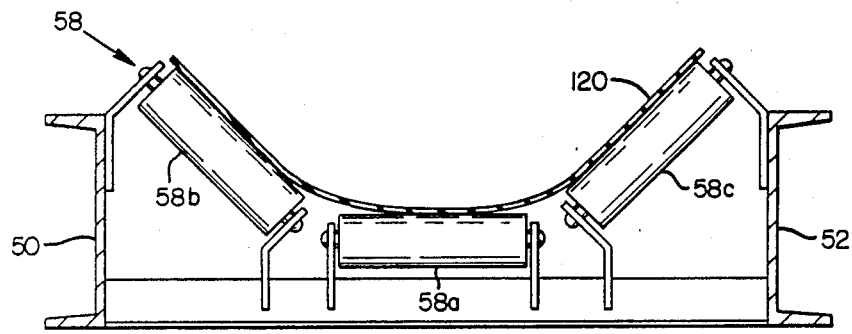
FIG. 4 is a cross-section view, somewhat enlarged, taken generally along the line 4—4 in FIG. 2.

Conveyor frame section 46, and referring to FIGS. 2, 3 and 4, is made up of a pair of longitudinals 50, 52 located adjacent opposite sides of the vehicle frame but inwardly of the longitudinals 13a, 13b of the vehicle frame. These are suitably rigidly secured on the vehicle frame by means including struts, such as strut 54, rigidly supporting the forward end of each of the longitudinals. Distributed along the length of longitudinals 50, 52 are a plurality of roller belt supports 58. Each roller belt support, and as illustrated in FIG. 4, includes a bottoming roller 58a, and sloping side-forming rollers 58b, 58c. These various rollers, and when supporting a conveyor belt trained thereover, function to shape the belt whereby it forms a shallow trough for holding material conveyed by the belt.

Continuing with a description of the articulated belt conveyor system, indicated at 62 is a second conveyor frame section, having an end 62a adjacent end 46b of the first conveyor section, and an opposite end 62b. This conveyor frame section, like conveyor frame section 46, includes a pair of laterally spaced longitudinals, exemplified by longitudinal 64, suitably rigidly interconnected. Supported at locations distributed on the lengths of longitudinals are roller belt supports 66 which may be similar to roller belt supports 58. End 62a of the second conveyor frame section is pivotally mounted, at 68, on struts 54. This pivot mounting, or hinge connection, established between the first and second conveyor frame sections, enables section 64 to swing from the position shown in FIG. 2, which is a relatively folded position with the section extending back over the top of the first conveyor frame section, to the position shown in FIG. 3, where conveyor frame section 62 is an in-line extension of first conveyor frame section 46.

Belt conveyor system 36 further includes another or third conveyor frame section, shown at 70. This conveyor frame section has one end 70a disposed adjacent end 62b of the second conveyor frame section, and an opposite or remote end 70b. The conveyor frame section, like the other frame sections, may include laterally spaced longitudinals, such as longitudinal 72, suitably interbraced and forming the sides of the frame section. Mounted on these longitudinals are spaced roller belt supports 74 which may resemble roller belt supports 58. Because of the extra length of this conveyor frame section, providing additional strengthening to the longitudinals is trusswork, such as that shown in 76.

End 70a of conveyor frame section 70 is pivotally connected, at 80, to frame section 62. This pivot mounting provides a hinge connection enabling swinging of the conveyor frame section 70 from its position stacked over conveyor frame section 62, as illustrated in FIG. 2, to a position wherein frame section 70 is an in-line extension of conveyor frame section 62, as shown in FIG. 3.

Pivotally or hingedly connected to the end of the conveyor system, with such in its extended state as shown in FIG. 3, is screen assembly 40 earlier described. The pivot means providing this pivot connection is shown at 88, and pivotally connects the housing structure of the screen assembly with a portion of the frame in the third conveyor frame section.

Power-operated means is provided for changing the incline of the screen assembly. Specifically, such takes the form of a pair of fluid-operated rams, one being provided on each side of the screen assembly, as exemplified by ram 90. The rams extend between the third conveyor frame section and the housing of the screen assembly. With extension of the rams, the screen assembly is urged to a more horizontal position, and with contraction of the rams, the screen assembly inclines in the opposite direction.

The construction of the screen assembly may take different forms depending upon the number of different size ranges desired to be obtained from the material processed, the mesh size of any screens involved, and where different piles are desired to be produced. In the screen assembly pictured in FIG. 1, two screen decks are provided, with one being indicated at 96 and operating to deliver material which travels over the deck to a chute 98 which deflects falling material cascading from the chute well forwardly and outwardly from the screen assembly. Another screen deck is illustrated at 100, this being spaced below screen deck 96 and operating to direct material falling thereover onto a chute 102 which deflects material cascading from the chute forwardly, but at not such a great distance as chute 98. Material passing through screen deck 96 and screen deck 100 falls directly through the screen assembly to be deflected by deflectors 104, 106 to form a building pile essentially directly below the screen assembly.

The chutes and deflectors disclosed may be pivotally mounted on the housing of the screen assembly and swung to an unfolded position to have an operative position in the screen assembly. Supporting the pans in their unfolded operative position are chains such as chain 110.

Figure 5:
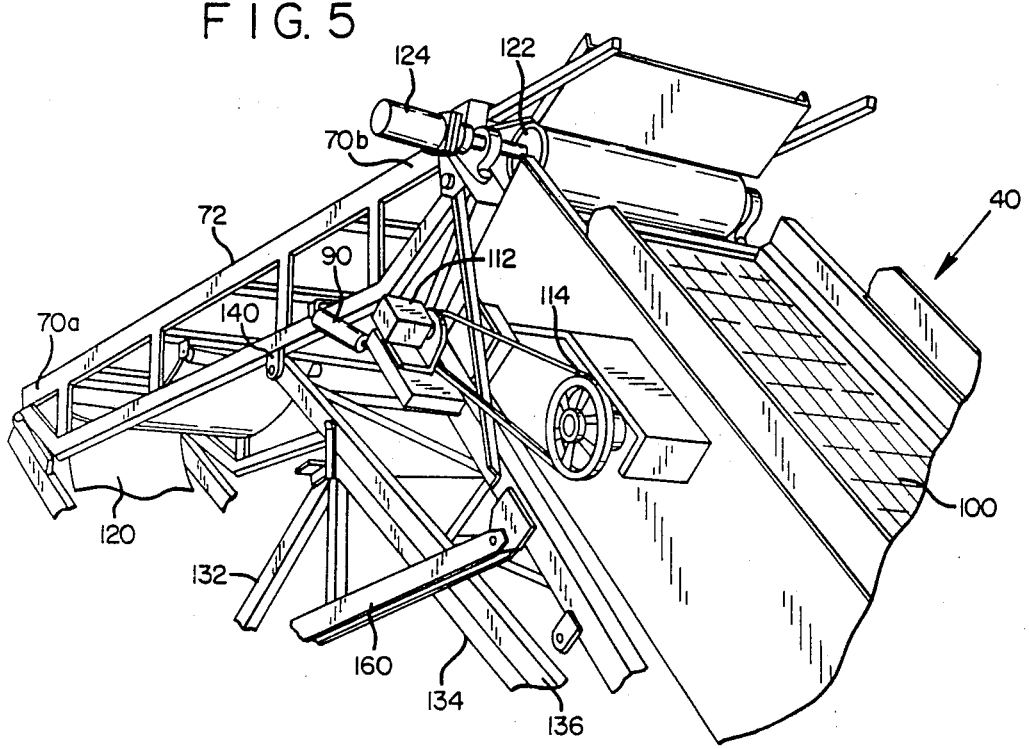
FIG. 5 is a perspective view illustrating the screen assembly from the side of the apparatus opposite the side illustrated in FIG. 1.

Referring to FIG. 5, which is a perspective view, on a somewhat larger scale of the opposite side of the screen assembly from the side appearing in FIG. 1, the screens in the assembly may be oscillated under power. Producing such oscillations is a hydraulic motor 112 and a pulley and belt system 114 connecting this hydraulic motor to a suitable eccentric (not shown) which serves to oscillate the screens.

The first, second and third conveyor frame sections, and more specifically the roller belt supports which are found in these sections, provide a rolling support for an elongate conveyor belt 120. The upper run of this belt, as shown in FIG. 3, and with the conveyor frame sections in-line, defines an inclined conveyor path for material extending upwardly from under loading hopper 30. Ordinarily, the incline of this belt will not exceed about 17°, which by experience has been noted to be about the sharpest angle that can be utilized without having slippage of the material on the belt. Adjacent the discharge end of the conveyor system, and referring to FIG. 5, the belt extends over a power-driven roller 122, thence to extend in a return run underneath the upper run to the infeed end of the system. As can be seen in FIG. 5, roller 122 is rotated under power to move the conveyor belt by a hydraulic motor 124.

Among the important features of the invention is that the various conveyor frame sections are movable between a position wherein the conveyor system is stacked on itself and collapsed, and a extended state or position, by a linkage system supporting the frame sections for movements in defined paths. The frame sections of the conveyor system remain interconnected, eliminating the need for assembling separate sections at the job site. Furthermore, with the conveyor system in its extended state, as shown in FIG. 3, the frame sections in the system derive substantially their entire support from the vehicle frame. Again, this is convenient since there is no requirement that external additional, support be provided which is set up at the construction site.

Further explaining, illustrated at 130 is what is referred to herein as a raised, stabilizing frame. Such in side elevation, as shown in FIGS. 2 and 3, has an inverted V-shaped outline. The stabilizing frame is integrally joined to the vehicle frame, and extends upwardly from longitudinals 13a in the vehicle frame adjacent the forward end of the frame.

The stabilizing frame, has a rearwardly facing inclined platform 132, and a forwardly facing inclined platform 134.

Earlier, the third conveyor frame section was described as hinged at its end 70a to end 62b of the second conveyor frame section. The opposite end of this third conveyor frame section has depending from its underside a pair of elongate linkage struts 136 (one being provided at each side of the frame section). These are pivotally connected at 140 to the third conveyor frame section, and pivotally connected at 50 to the vehicle frame.

With the conveyor system in its collapsed state as shown in FIG. 2, linkage struts 136 incline rearwardly to lie against platform 134. In this position the struts stabilize the conveyor system with the system in its collapsed state. The base of the screen assembly may be brought up snug against the forward end of the vehicle frame through actuation of rams 90.

With the conveyor system swung to its extended state as shown in FIG. 3, struts 136 swing about pivots 150 to incline forwardly and still provide support for the now extended third conveyor frame section.

Pivotally mounted on the underside and on either side of the screen assembly are a pair of supporting struts 160. Each of these extends downwardly to an anchoring end 160a which, with the system collapsed as in FIG. 2, is detachably anchored to a rail 162 with a bolt 164. This anchoring is at a location adjacent the rear of rail 162. With detachment of this bolt, and with the conveyor system shifted to be in its extended state, the bolt may be used to secure the anchoring end of the supporting strut at different bore locations 166 located adjacent the opposite end of rail 162, as should be apparent from viewing FIG. 3.

A fluid-operated ram 170 provided adjacent each side of the apparatus has its cylinder end supported through a trunnion mounting 172 on the first conveyor frame section. The rod ends of these rams are pivotally connected at 174 to an intermediate region of the second conveyor frame section 62. With the conveyor system in its stacked, collapsed state, as shown in FIG. 2, these rams may be actuated to cause the second frame section to swing on pivot 68, and to cause the third conveyor frame section to be thrust forwardly while swingably supported on struts 136.

Figure 6:
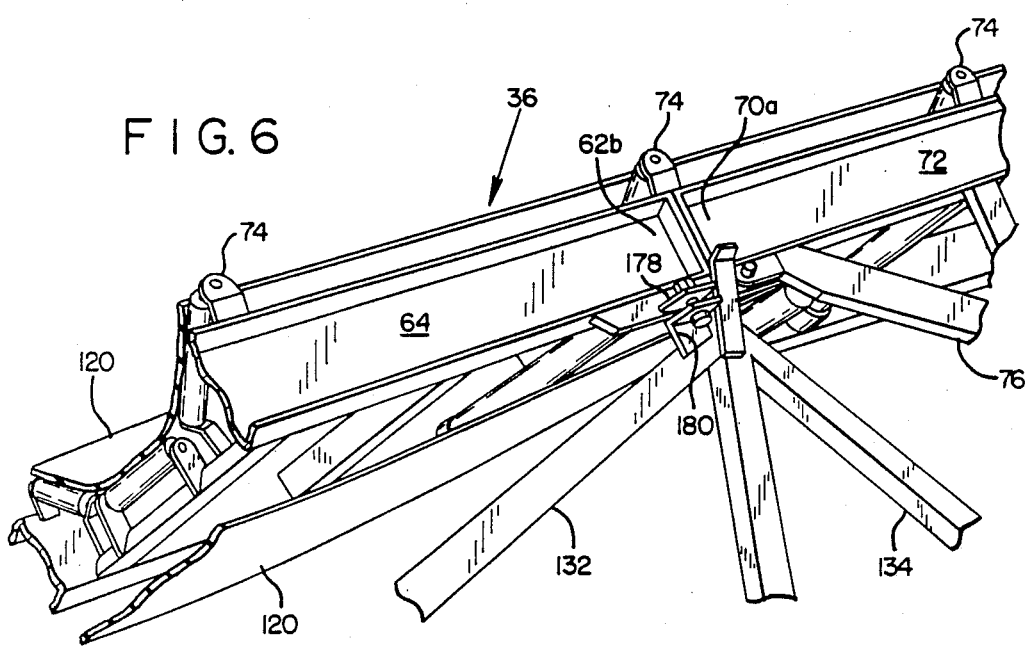
FIG. 6 is a somewhat enlarged view showing an intermediate region of the conveyor system with the system extended.

Referring to FIG. 6, with the conveyor system in its extended state, an anchor bracket 178 joined to the underside of end 62a of the second conveyor frame section becomes positioned over an anchor bracket 180 joined to stabilizing frame 130 adjacent its apex. With these anchor brackets secured together, the stabilizing frame stabilizes the conveyor system with such in its extended state adjacent where the second and third conveyor frame sections join with each other.

Loading hopper 30 (see FIG. 1) is provided with a lid 185 hinged to the top of the hopper and swung between open and closed positions through actuation of a ram 187. Forming the base of hopper 30 is a feed belt 190 trained over head and tail pullies 192, 194. The head pulley is powered to rotate whereby the upper run of the feed belt in FIGS. 2 and 3 moves from left to right, with material carried by the belt then dropping onto the conveyor belt of conveyor system 36. Adjustable control gates (not shown) positioned over the feed belt in the region where the belt moves out from under hopper 30, regulate the depth of the layer of material carried by the feed belt to be deposited on conveyor system 36.

The operation of the mobile screener described should be obvious from the above discussion. The apparatus is adapted for movement over the road with the conveyor system in its stacked state as shown in FIG. 2, and with the forward end of the vehicle frame suitably supported at its fifth wheel on the drawing truck tractor. Jacks 18 are actuated to be contracted so that their lower ends are above ground level.

With the apparatus moved to the crusher site, the landing gear jacks are cranked down to be lowered into ground. The drawing truck tractor is removed. Leg structure 20 is mounted under the forward end of the vehicle frame to stabilize it. The vehicle frame further is blocked, where necessary, to provide the necessary stability.

The conveyor system then may then be shifted to unfold it and place it in its extended position. This is performed by freeing the anchoring ends of supporting struts 160 from rails 162. Rams 170 are extended. End 62b of conveyor frame section 62 then swings up and forwardly. Forward end 70b of the third conveyor frame section moves forwardly in an arc as supported through struts 136.

With the various frame sections of the conveyor system extended and in-line, as shown in FIG. 3, struts 160 are secured in an appropriate position to rails 162. The forward end of the second conveyor frame section is secured to the stabilizing frame by intersecuring anchor brackets 178, 180.

With unfolding of the various chutes or deflectors in the screen assembly, starting motor 112 of the screen assembly, and starting motor 124 which drives the conveyor belt, the apparatus is ready for the processing of material dropped onto the conveyor belt from loading hopper 30.

From this description, it will be seen that there is no need using the apparatus that has been described for having auxiliary equipment at the set-up site to enable the making of connections between unjoined parts in the conveyor system. The frame sections in the conveyor system are all hinged together and move in defined paths as determined by their hinged interconnections and by the supporting struts described. With the conveyor system extended, and with the screen assembly at the proper angle, the screen assembly, as well as the conveyor system, are all supported on the vehicle frame. As a consequence, the mobile screener of the invention may be driven to the crusher site and in a matter of minutes placed in an operative condition to perform the screening operation.

To ready the apparatus for road transport, the anchoring ends of the supporting struts are freed, and anchor brackets 178, 180 are freed from each other. With contraction of rams 65, the hinged and strut-supported frame sections of the articulated conveyor system swing back on each other until the folded state shown in FIG. 2 is reached. With the conveyor system in the collapsed, folded-up state, the apparatus has a height less than maximum height limitations imposed by state and federal governments.

While an embodiment of the invention has been described, it is obvious that variations and modifications are possible without departing from the invention. It is desired to cover all such modifications and variations as come within the scope of the invention.

I claim:

1. Mobile material-handling apparatus comprising:
an elongate wheel-supported vehicle frame,
an articulated belt conveyor system including multiple hingedly interconnected conveyor frame sections, said conveyor frame sections including one conveyor frame section having a hinged lower end hinged for pivotal movement about a hinge axis and an upper end which swings in an arc with pivotal movement of the section, the conveyor frame sections further including another conveyor frame section hinged for pivotal movement to said upper end of said one conveyor section,
linkage structure movably supporting said other conveyor frame section of the conveyor system on said vehicle frame and defining for the conveyor system a collapsed state wherein said other frame section is folded against said one conveyor frame section to accommodate road transport of the apparatus, the linkage structure providing for shifting of the conveyor frame sections to place the conveyor system in an extended state wherein said other conveyor frame is aligned with said one conveyor frame section to ready the conveyor system for the handling of material, and
powered means for producing movement of the sections while supported by the linkage structure to shift the conveyor system between its collapsed and extended states.

2. The apparatus of claim 1, which further includes a screen assembly hinged to an end of the belt conveyor system, and a strut hinged to the screen assembly and extending to a connection with said vehicle frame, said strut supporting the screen assembly in an inclined position with the conveyor system in its extended state.

3. The apparatus of claim 2, which further includes fluid-powered means interposed between the screen assembly and said conveyor system actuatable to adjust the incline of the screen assembly, and wherein said strut is connectible at multiple locations with said frame, with the particular location depending upon the incline of the screen assembly.

4. The apparatus of claim 1, wherein the conveyor system in its extended state, extends longitudinally of the vehicle frame from a lower end disposed between the ends of the vehicle to an upper end disposed beyond one end of the vehicle frame, and which further includes a hopper mounted on the vehicle frame positioned to drop material onto the lower end of the conveyor system.

5. The apparatus of claim 1, wherein the conveyor system in its extended state extends longitudinally of the vehicle frame from a lower end disposed between the ends of the vehicle frame to an upper end disposed beyond one end of the vehicle frame, and which further includes a hopper mounted on the vehicle frame positioned to drop material onto the lower end of the conveyor system, a screen- and pivot means pivotally mounting the screen on the upper end of the conveyor system with such in its extended state, said screen inclining downwardly from the conveyor system, and a strut hingedly connected to the screen assembly extending from the screen assembly to the vehicle frame.

6. The apparatus of claim 5, which further includes power-operated means interposed between the upper end of the conveyor system and said screen assembly actuatable to change under power the incline of the screen assembly relative to the conveyor system, said strut being connected with the vehicle frame at different positions depending upon the incline produced by said power-operated means.

7. The apparatus of claim 5, which further includes a stabilizing frame mounted on the vehicle frame, said conveyor system including means securable with said stabilizing frame with the conveyor system in an extended state.

8. Mobile material-handling apparatus comprising:
a wheel-supported vehicle frame,
belt conveyor means including an elongate conveyor belt and multiple elongate conveyor frame sections operable collectively to provide support for the conveyor belt,
said conveyor frame sections including one conveyor frame section which is fixedly mounted on said vehicle frame and has upper and lower ends and that inclines upwardly from the vehicle frame, said conveyor frame sections further including a second conveyor frame section and first hinge means hingedly connecting one end of the second conveyor section to the upper end of said one conveyor frame section, said second conveyor section having a folded position where it is folded over to lie alongside said one conveyor frame section, said conveyor frame sections further including a third conveyor frame section and second hinge means hingedly connecting one end of the third conveyor frame section to the opposite end of said section conveyor frame section, said third conveyor frame section having a folded position folded over and collapsed against said second conveyor frame section, said first hinge means movably supporting said second conveyor frame section whereby it may be swung in a defined path from its said folded position to an operative position where said second frame is an in-line extension of said one frame section, linkage structure movably supporting said third conveyor frame section for movement between its said folded position and a position where said third conveyor frame section is an in-line extension of said second conveyor frame section, and powered means connected to said second and frame sections for producing movement of the frame sections under power.

9. The apparatus of claim 8, which further includes a hopper for supplying material mounted on said vehicle frame disposed over said lower end of said one conveyor frame section, and a screen assembly hingedly connected to an opposite end of said third conveyor frame section.

10. The apparatus of claim 8, which further includes a stabilizing frame mounted on said vehicle frame positioned so as to be under and provide support for said opposite end of said other conveyor frame section with said other frame section in said operative position.

* * * * *